United States Patent Office 2,893,863
Patented July 7, 1959

2,893,863
PROCESS FOR REMOVING ALUMINUM COATINGS

Jack Flox, Chicago, Ill., assignor to the United States of America as represented by the United States Atomic Energy Commission No Drawing. Application May 13, 1949
Serial No. 93,185

11 Claims. (Cl. 75—101)

This invention deals with a process for removing aluminum coatings from articles, such as metal articles, and in particular with a process for removing aluminum jackets or cans from uranium slugs for the purpose of cleaning said slugs prior to recanning them or for the purpose of dissolving the jackets prior to further processing.

The process is applicable to non-bonded aluminum coatings, and to aluminum coatings which are bonded, for example, by means of an aluminum-silicon alloy or by means of zinc, and yields satisfactory results in all cases.

It is known that when uranium is bombarded with neutrons, radioactive fission products and certain transuranic elements are formed. It is often important to recover these fission products as well as other radioactive elements that are formed for purposes of study and for other uses. In order to carry out the neutron bombardment under the best conditions with a minimum loss of valuable products and to minimize corrosion of uranium, the slugs are incased in a aluminum jackets before being subjected to neutron bombardment. Following the neutron bombardment, the problem arises of removing the aluminum jacket in order to dissolve the uranium and the desired products.

It has been suggested to treat and dissolve aluminum coatings with sodium hydroxide solutions; however, this method is very hazardous on account of the development of hydrogen gas. Also, in this method the quantity of gas developed is so large as to necessitate bulky equipment.

It is thus an object of this invention to provide a process for removing aluminum coatings which is free from all of the disadvantages enumerated above.

It is an object of this invention to provide a process for removing aluminum coatings with a solution which does not attack the uranium appreciably.

It is an object of this invention to provide a process for removing aluminum coatings in which the dissolved aluminum does not have any bearing on the attack or corrosion of the base material by the solution so that corrosion remains negligibly low during the entire process.

Another object of this invention is to provide a process for removing aluminum coatings for which a relatively small volume of solution is required.

Another object of this invention is to provide a process for removing aluminum coatings in which a minimum volume of gas is developed.

Still another object of this invention is to provide a process for removing aluminum coatings in which no explosive or inflammable gas is developed.

Still another object of this invention is to provide a process for removing aluminum coatings in which only a small amount of insoluble residue is formed.

Still another object of this invention is to provide a process for removing aluminum coatings in which no foaming occurs during the operation.

Still another object of this invention is to provide a process for removing aluminum coatings in which no gel formation occurs in the solution.

It is finally still another object of this invention to provide a process for removing aluminum coatings from base metals in which the rate of reaction may be controlled without difficulty.

These and other objects are accomplished by treating the aluminum-coated articles with an aqueous solution of sodium hydroxide and sodium nitrate.

When an aluminum-coated article, according to one of the processes known heretofore, is treated with sodium hydroxide at room temperature, the aluminum is dissolved immediately; the reaction takes place according to the equation:

$$2H_2O + 2NaOH + 2Al \rightarrow 2NaAlO_2 + 3H_2$$

and hazardous hydrogen gas is evolved. If, however, according to this invention, a mixture of sodium hydroxide and sodium nitrate is employed, ammonia gas is developed instead of hydrogen so that no danger of explosion exists. The predominant reaction takes place according to the following equation:

$$2H_2O + 3NaNO_3 + 5NaOH + 8Al \rightarrow 8NaAlO_2 + 3NH_3$$

On the side, part of the material will react according to the following equation:

$$3NaNO_3 + 2NaOH + 2Al \rightarrow 2NaAlO_2 + 3NaNO_2 + H_2O$$

Also in this latter case, hydrogen is not set free. If a uranium slug is treated which has the aluminum coating bonded to it by means of an aluminum-silicon alloy, the silicon reacts with the sodium hydroxide according to the following equation:

$$H_2O + 2NaOH + Si \rightarrow Na_2SiO_3 + 2H_2$$

The amount of hydrogen gas formed during said latter process is not reduced by the sodium nitrate present. However, the silicon content of said bonding alloys is so low that the hydrogen content of the final gas is far below the explosion limit.

In carrying out the process of this invention, a concentration of sodium hydroxide solution is preferably used which does not exceed 30%, because otherwise the sodium hydroxide would attack the uranium metal, which is most undesirable, and also because too much sodium hydroxide would be required in order to have sufficient liquid for covering the slugs or other coated articles. On the other hand, the initial concentration of sodium hydroxide should preferably not be lower than 10% so that no hydrous alumina precipitates. Apart from this, the higher the concentration of sodium hydroxide is, the faster the reaction takes place and the more gas is developed in a certain period of time so that the dimensions of the equipment have to be adjusted accordingly. In order to prevent precipitation of alumina, the molar ratio of sodium hydroxide to aluminum is preferably at least 1.65.

Uranium slugs usually contain about 27.9 kg. of aluminum per metric ton. In this specific case, a quantity of from 75 to 100 gallons of solution per ton of aluminum-coated uranium slugs has been found suitable. While concentrations of from 9% to 20% by weight for the aqueous sodium hydroxide solution and of from 35% to 12% for the sodium nitrate solution are suitable, it is preferred to stay within the limits of 9% to 16% by weight of sodium hydroxide and 21% to 12% of sodium nitrate. Excellent results have been obtained, in the case of aluminum-coated uranium slugs, with a mixture of a 10%-solution of sodium hydroxide and 20%-solution of sodium nitrate. The molar ratio of sodium hydroxide to aluminum, as has been mentioned above, should preferably be above 1.65; however, a ratio of from 1.25 to 2.00 is suitable.

In the case, for instance, of a mixture containing a 10%-solution of sodium hydroxide and 20%-solution of sodium nitrate and a molar ratio of sodium hydroxide to aluminum above 1.65, the mixture may be prepared by using 2.45 lbs. of solid sodium hydroxide per 1 lb. of aluminum with the appropriate amount of sodium nitrate, and by then adding to the salts sufficient water to obtain the desired concentration of 10% sodium hydroxide and 20% sodium nitrate. Instead of using the solid salts, however, the mixture may also be prepared by using commercial 60%-solution of nitric acid and a 50%-solution of sodium hydroxide and by then adding sufficient water to obtain a mixture in which the concentration of sodium hydroxide is 10% and that of the sodium nitrate is 20%. In this latter case, the reaction heat suffices to bring the mixture to the boiling point.

The temperature range at which the process may be carried out is between 50° C. and the boiling point of the solution; however, a range of from 50 to 115° C. is preferred. The reaction proceeds three times as fast at 100° C. as it does at 60° C.

It is advisable to maintain the temperature of the gas outlet pipe below 45° C. in order to avoid an explosion of an ammonia-air mixture.

After the aluminum has been dissolved by the process described above, cleaning methods may be used for removing contaminations still adhering to the surface of the base metal. In the case of uranium, it has been found advantageous first to rinse the article with water; if the aluminum was bonded to the uranium with an aluminum-silicon alloy, this water rinse slurries residues of said bond away. After the water rinse, a rinse with a dilute nitric acid solution, e.g., with a 5% aqueous solution of nitric acid, is applied; this latter rinse removes the zinc metal if the aluminum was bonded to the uranium by means of zinc. Another suitable cleaning method, after the sodium hydroxide-sodium nitrate treatment, is by a short immersion into concentrated nitric acid, for instance, of from 50% to 60% by weight.

The following examples are given for the purpose of illustrating the process of this invention without the intention to limit the scope of the invention to the specific details presented therein.

*Example I*

A batch of 856 uranium slugs, which had a coating of aluminum bonded to the uranium by means of an aluminum-silicon alloy, was first aged in water. The slugs were then introduced into a dissolver tank which contained 3850 lbs. of a 26% aqueous solution of sodium nitrate. The temperature of the sodium nitrate was kept below 35° C. by means of cooling water flowing through coils arranged in said tank. About 1070 lbs. of a 50% aqueous solution of sodium hydroxide was then added; this yielded a mixture in which the sodium hydroxide was present in a concentration of 10% and that of sodium nitrate in a concentration of 20%. The temperature of the solution was allowed to rise by the reaction heat to from 55 to 75° C. which was accomplished by discontinuing the supply of cooling water. At times, when necessary, steam was introduced into the cooling coils. This temperature of between 55 and 75° C. was maintained for a period of from twenty to thirty minutes; during this time the aluminum sidewalls of the slugs were completely dissolved. Thereafter, the temperature was increased to between 103 and 108° C. and maintained there for three hours, whereafter the thick endcaps of the slugs and the aluminum-silicon bond had been dissolved. The solution was then cooled to approximately 35° C. and transferred to waste. Thereafter, the dissolver tank and the cleaned slugs were washed with about 100 gallons of water which also was discarded and finally they were rinsed with approximately 4,000 lbs. of a 5%-solution of nitric acid whereby the residual caustic was neutralized and sludges, such as cupric hydroxide and ferric hydroxide derived from a bronze coating of the slug put on prior to applying the bond, were dissolved. Also, this nitric acid solution was jetted to waste. The slugs were then removed, and the apparatus was then ready for a new batch. The slugs thus treated had an entirely clean and smooth surface.

*Example II*

Nine hundred lbs. of an aqueous solution containing sodium hydroxide and sodium nitrate in concentrations of 10% and 20% by weight, respectively, were used to remove a 20-mil thick aluminum jacket from a 1-ton batch of uranium slugs. This represented a 300% excess over stoichiometric quantities. The bath was 8 in. deep in the tank. The temperature of the bath was adjusted to 40° C. and the metal then charged into the dissolver tank. The temperature rose to 100° C. within five to ten minutes; this temperature was then maintained by means of steam for one hour when the coating was completely removed from the slugs. As in Example I, the slugs were then subjected to an after-treatment and the container was prepared for a new high batch by washing with 400 lbs. of water and thereafter with 440 lbs. of a 5% aqueous solution of nitric acid. Also, in this case, the surface of the slugs was satisfactorily clean, although the uranium itself had not been noticeably attacked.

*Example III*

Two hundred eighty lbs. of a 50%-solution of sodium hydroxide and 533 lbs. of water were introduced into a dissolver tank. This solution was sparged with air; after it had cooled, 358 lbs. of a 60%-solution of nitric acid were added gradually in such quantities that the temperature did not exceed 70° C. After neutralization and mixing had been completed, the liquid was cooled to 30° C. by introducing cooling water into coils arranged in the dissolver. Two-thirds of a ton of uranium slugs from which the aluminum was to be removed was then introduced into the sodium hydroxide-sodium nitrate solution. Thereafter, another 280 lbs. of a 50% sodium hydroxide solution was gradually added seeing to it that the pressure in the exhaust line of the container did not exceed 5 in. of water. When said pressure and the temperature started to drop, the supply of cooling water was cut off, and steam was introduced instead until a temperature of 100° C. was reached in the solution. This temperature was maintained for one hour, when all of the aluminum of the coating had been dissolved. The solution was then cooled to 35° C. by means of cold water introduced into the coils, and at the same time it was sparged with air. The solution containing all of the aluminum was then jetted to waste, and the container with the decoated slugs was washed with 400 lbs. of water, air-sparged for ten minutes, and finally washed with 400 lbs. of water containing 40 lbs. of 60% nitric acid and again sparged with air. Both solutions, the water and the nitric acid, were jetted to waste after use.

While this process has been mainly described as applied to aluminum-coated uranium slugs, it will be understood that this description was merely given for simplicity's sake and that this process is applicable as well to other metals, such as thorium and plutonium, and materials which are not appreciably attacked by sodium hydroxide-sodium nitrate solutions and which are coated with aluminum.

It will also be understood that while there have been described herein certain specific details, it is not intended to have the invention limited thereto, since the invention is susceptible to various modifications and changes which come within the spirit of this disclosure and the scope of the appended claims.

What is claimed is:

1. A process for removing aluminum coatings from uranium metal articles, comprising treating said coated articles with an aqueous solution having initial concentrations by weight of 9% to 20% sodium hydroxide and 35% to 12% sodium nitrate and separating the treated article from said solution.

2. A process for removing aluminum coatings from uranium metal slugs to which said coatings are bonded by means of an aluminum-silicon alloy, comprising treating said coated articles with an aqueous solution having initial concentration by weight of 9% to 20% sodium hydroxide and 35% to 12% sodium nitrate, and separating the resultant uranium slug from the resultant solution containing dissolved aluminum and silicon.

3. A process for removing aluminum coatings from uranium metal slugs to which said coatings are bonded by means of zinc, comprising treating said coated articles with an aqueous solution having initial concentrations by weight of 9% to 20% sodium hydroxide and 35% to 12% sodium nitrate and separating the resultant slug from the resultant treatment solution containing dissolved aluminum.

4. A process for removing aluminum coatings from uranium metal articles, comprising treating said coated articles with an aqueous solution of sodium hydroxide and sodium nitrate having initial concentrations by weight of from 10% to 30% sodium hydroxide and 35% to 12% sodium nitrate, said sodium hydroxide being used in such quantities as to yield a molar ratio of sodium hydroxide to aluminum of from 1.25 to 2 and separating the uranium metal articles from the resultant solution containing dissolved aluminum.

5. A process for removing aluminum coatings from uranium metal articles comprising treating said coated articles with an aqueous solution having initial concentrations by weight of 9% to 20% sodium hydroxide and 35% to 12% sodium nitrate, the quantity employed of said solution being sufficient to obtain a molar ratio of sodium hydroxide to aluminum of at least 1.65 and separating the resultant uranium articles from the resultant solution containing dissolved aluminum.

6. A process for removing aluminum coatings from uranium metal articles comprising treating said coated articles with an aqueous solution having initial concentrations by weight of 9% to 16% sodium hydroxide and 21% to 12% sodium nitrate, the quantity employed of said solution being sufficient to obtain a molar ratio of sodium hydroxide to aluminum of at least 1.65 and separating the resultant uranium articles from the resultant solution containing dissolved aluminum.

7. A process for removing aluminum coatings from uranium metal articles comprising treating said coated articles with an aqueous solution of 10% sodium hydroxide and 20% sodium nitrate, the quantity employed of said solution being sufficient to obtain a molar ratio of sodium hydroxide to aluminum of at least 1.65 and separating the resultant uranium articles from the resultant solution containing dissolved aluminum.

8. A process for removing aluminum coatings from uranium metal articles comprising treating said coated articles with an aqueous solution having initial concentrations by weight of 9% to 20% sodium hydroxide and 35% to 12% sodium nitrate, the quantity employed of said solution being sufficient to obtain a molar ratio of sodium hydroxide to aluminum of at least 1.65, said treatment being carried out at a temperature from 50° C. to the boiling point of said solution and thereafter separating the resultant uranium articles from the resultant solution containing dissolved aluminum.

9. A process for removing aluminum coatings from uranium metal articles comprising treating said coated articles at a temperature from 50° C. to 115° C. with an aqueous solution having initial concentrations by weight of 9% to 20% sodium hydroxide and 35% to 12% sodium nitrate, the quantity employed of said solution being sufficient to obtain a molar ratio of sodium hydroxide to aluminum of at least 1.65 and separating the resultant uranium articles from the resultant solution containing dissolved aluminum.

10. A process for removing aluminum coatings from uranium metal articles comprising treating said coated articles at a temperature from 50° C. to 115° C. with an aqueous solution having initial concentrations by weight of 9% to 20% sodium hydroxide and 35% to 12% sodium nitrate, the quantity employed of said solution being sufficient to obtain a molar ratio of sodium hydroxide to aluminum of at least 1.65; separating the resultant uranium articles from the resultant solution containing dissolved aluminum; rinsing said treated articles with water; and thereafter treating them with dilute aqueous solution of nitric acid.

11. A process for removing aluminum coatings from uranium metal articles comprising treating said coated articles at a temperature from 50° C. to 115° C. with an aqueous solution having initial concentrations by weight of 9% to 20% sodium hydroxide and 35% to 12% sodium nitrate, the quantity employed of said solution being sufficient to obtain a molar ratio of sodium hydroxide to aluminum of at least 1.65; separating the resultant uranium articles from the resultant solution containing dissolved aluminum; rinsing said treated articles with water; and thereafter treating them with a 5% aqueous solution of nitric acid.

References Cited in the file of this patent

UNITED STATES PATENTS

| | | |
|---|---|---|
| 1,544,824 | Field | July 7, 1925 |
| 1,648,954 | Marden | Nov. 15, 1927 |
| 2,355,777 | Benson et al. | Aug. 15, 1944 |

OTHER REFERENCES

Edwards et al.: "Aluminum Industry, Aluminum Products and Their Fabrication," vol. II, pp. 466–468, McGraw-Hill Book Co., Inc. (1930).